US006621268B2

(12) United States Patent
Usaki

(10) Patent No.: US 6,621,268 B2
(45) Date of Patent: Sep. 16, 2003

(54) OPERATION DIAGNOSING DEVICE, ARTICLE IDENTIFICATION DEVICE FOR USE THEREWITH, AND OPERATION DIAGNOSING SYSTEM

(75) Inventor: Yoshihiko Usaki, Ono (JP)

(73) Assignee: TLV Company, Limited, Hyogo-ken (JP)

( * ) Notice: Subject to any disclaimer, the term of this patent is extended or adjusted under 35 U.S.C. 154(b) by 141 days.

(21) Appl. No.: 09/735,187

(22) Filed: Dec. 11, 2000

(65) Prior Publication Data

US 2001/0005138 A1 Jun. 28, 2001

(30) Foreign Application Priority Data

Dec. 14, 1999 (JP) .......................................... 11-354039

(51) Int. Cl.[7] .......................... G01V 3/08; G08B 26/00
(52) U.S. Cl. .......................... 324/326; 324/67; 340/505
(58) Field of Search .......................... 324/67, 326, 639, 324/322, 334, 337, 759, 764; 340/505

(56) References Cited

U.S. PATENT DOCUMENTS 5,194,812 A * 3/1993 Yokoi ......................... 324/326
5,844,405 A * 12/1998 Eslambolchi et al. ....... 324/334
6,353,082 B1 * 3/2002 Alkire et al. ............... 324/326

FOREIGN PATENT DOCUMENTS

| | | | | |
|---|---|---|---|---|
| GB | 2294531 | * | 1/1996 | .......... G05G/25/00 |
| JP | 09-099191 | | 4/1997 | |
| JP | 09-207322 | | 7/1997 | |
| WO | WO 99/10673 | | 3/1999 | |

* cited by examiner

*Primary Examiner*—Christine Oda
*Assistant Examiner*—Anjan K. Deb
(74) *Attorney, Agent, or Firm*—Kenyon & Kenyon

(57) ABSTRACT

An article identification device 4 is mounted on a trap of which operation is diagnosed. The identification device 4 includes a memory 47 in which trap identification data is stored. When the identification device 4 receives an electromagnetic wave from a trap operation diagnosing device, a rectifier 46 derives DC power from the electromagnetic wave, which DC power drives the memory 47 and a modulator 48 so that an electromagnetic wave containing the trap identification data can be sent to the operation diagnosing device. The operation diagnosing device derives the trap identification data from the received electromagnetic wave to identify the trap whose operation the operation diagnosing device diagnoses.

16 Claims, 4 Drawing Sheets

OPERATION DIAGNOSING DEVICE, ARTICLE IDENTIFICATION DEVICE FOR USE THEREWITH, AND OPERATION DIAGNOSING SYSTEM

This invention relates to a diagnosing device for diagnosing an operating state of an object, by taking in predetermined information from an article identification device disposed in, on or near the object. The predetermined information is for identifying the object and may include, for example, the model of the object, the object number attached to the object for management purpose and so forth. The present invention relates also to such article identification device, and also an operation diagnosing system including a combination of such operation diagnosing device and such article identification device.

BACKGROUND OF THE INVENTION

An example of known identification devices is a bar code. Information, such as the model and object number for use in management of an object of which operating state is to be diagnosed, is converted into a bar code and printed on a label. The label is attached directly to the object or indirectly on a plate, for example, which is disposed near the object. An optical reader is used to read the bar code when the operation of the object is to be diagnosed. Thus information about the object, such as the model and object number of the object to be inspected, can be read easily without resort to human eyes. The information thus read by means of the optical reader can be automatically inputted into an operation diagnosing device, whereby data inputting at the time of diagnosing and managing objects can be done at an increased efficiency.

When a bar code is used to identify an object, a reading head of an optical reader must be brought into contact with or placed directly in front of the object. Therefore, it is inevitable to dispose a space in front of the bar code label to allow the reader head to be placed therein. Thus, locations where bar code labels can be placed are disadvantageously restricted.

Another problem with the use of bar codes is that stains and scratches on surfaces of bar code labels may cause erroneous reading or make it impossible to read the bar codes. This problem may be worsen when bar codes are attached to objects used in environments where the bar codes are subjected to dust and staining materials, e.g. in plants or the outdoors.

The above-described apparatus requires, in addition to a diagnosing device, a separate optical reader when diagnosing operations of objects, which makes the operation diagnosis cumbersome.

Therefore, an object of the present invention is to provide an article identification device which can be placed almost anywhere and of which the function is hardly affected by stains and scratches.

Another object of the present invention is to provide an object operation diagnosing device which includes a function for taking in information borne by the article identification device and which is easy to handle. A further object of the present invention is to provide an object operation diagnosing system composed of a combination of the article identification device and the operation diagnosing device.

SUMMARY OF THE INVENTION

An operation diagnosing device according to the present invention includes a first transmitter section outputting a first transmission signal, a first transmitting element receiving the first transmission signal from the first transmitter section, converting the received first transmission signal into a first RF signal and radiating the first RF signal into a space, a first receiving element receiving a second RF signal from the space and converting the received second RF signal into a first reception signal, and a first receiver section receiving the first reception signal and deriving predetermined information of an object to be diagnosed from the first reception signal.

An article identification device according to the present invention includes a second receiving element receiving the first RF signal from the space and converting it into a second reception signal, and a second receiver section receiving the second reception signal from the second receiving element and generating and outputting a command to respond. The article identification device further includes a second transmitter section which includes a memory, e.g. a semiconductor memory, in which predetermined information relating to the object to be diagnosed has been stored. The second transmitter section outputs a second transmission signal containing the predetermined information stored in the memory when the command to respond from the second receiver section is applied to it. The article identification device also includes a second transmitting element which receives the second transmission signal, converts it into the second RF signal and radiates the second RF signal into the space. The article identification device is mounted in, on or near the object to be diagnosed directly or indirectly by means of a suitable mounting means.

An object operation diagnosing system according to the present invention includes the above-described diagnosing device and one or more article identification devices described above. With the diagnosing system, the first RF signal is transmitted to and received by the article identification device and the second RF signal is wirelessly transmitted to and received by the diagnosing device.

The predetermined information relating to an object is information by which the object can be identified and may include, for example, information about the model of the particular object, an object number arbitrarily assigned to the object, the specification of the object and/or the location where that object is disposed.

The diagnosing device radiates the first wireless RF signal into the space around it. When the diagnosing device is brought near to the article identification device, the first RF signal is received by the article identification device with an increased field strength. When the RF signal is received with a field strength above a predetermined level, the article identification device radiates the second RF signal containing the predetermined object information stored in the memory in response to the first RF signal. The diagnosing device receives the radiated second RF signals from the article identification device, and retrieves the predetermined information in the second RF signal, whereby the object to be diagnosed can be correctly identified.

Thus, according to the present invention, the object identifying information is transmitted wirelessly, i.e. in a non-contact fashion, from the article identification device to the object operation diagnosing device.

The first transmitter section of the diagnosing device may be arranged to output the first transmission signal only when a command to transmit the first transmission signal is externally applied to it.

The operation diagnosing device according to the present invention has not only a function to measure some quantity or quantities indicating the operating state of an object and determine whether or not the object is operating normally, but also a function to take in information regarding the object from the article identification device associated with the object. The means for realizing the taking in of information, namely, the first transmitter section, the first transmitting element, the first receiving element and the first receiver section are placed together with diagnostic means in a common casing.

The first transmitting element and the first receiving element may be realized by a single device, so that the diagnosing device can be simplified and manufactured at a lower cost.

The operation diagnosing device may be provided with a setting unit for automatically setting or selecting part or all of the information retrieved by the first receiver section in the diagnosing device. For example, by so arranging the diagnosing device as to be able to automatically set data contained in the retrieved information relating to an object, such as the type or model of the object and the management number, troublesome inputting of such data can be avoided.

The first transmission signal is, for example, an alternating signal with fixed frequency and amplitude, such as a single-frequency sine-wave signal and a square pulse signal with fixed pulse width and period. Since the first RF signal need be received and recognized by the article identification device simply as a request from the diagnosing device for sending back the information regarding the object to the diagnosing device, and it need not contain any other special information. Therefore, the first transmission signal from which the first RF signal is prepared need be simply an AC signal. In other words, the first transmission signal can be a simple carrier, so the first transmitter section can have a simple structure, which makes it possible to manufacture the device at a lower cost.

The second transmitting element and the second receiving element of the article identification device may be formed as a single device, whereby the device can have a simplified structure and be manufactured at a lower cost.

The second receiver section may be so arranged as to derive power from the received first RF signal sent from the diagnosing device and to output the derived power as the command to respond. Then, the second receiver section can be formed of a rectifying circuit or rectifying and smoothing circuit including only passive devices. Since the power for driving the second receiver section including the memory is derived from the first RF signal sent from the diagnosing-device, no separate power supply need be provided for the article identification device. This can simplify the structure of the identification device and makes it possible to manufacture it at a lower cost.

Part or all of the respective constituents of the article identification device, namely, the second receiving element, the second receiver section, the second transmitter section and the second transmitting element, may be formed in a single unit by, for example disposing them in a single casing. This makes the article identification device compact, and the management and handling of the identification devices are easy.

The first RF signal may be inductively transmitted from the first transmitting element to the second receiving element of the article identification device, so that they can be inductively coupled. Inductive coupling of the first transmitting element with the second receiving element can suppress propagation loss of the first RF signal, which, in turn, makes it possible to reduce the power to be used in transmitting and receiving the RF signal.

Similarly, the second RF signal may be transmitted from the second transmitting element in the article identification device to the first receiving element on the operation diagnosing device, by placing the operation diagnosing device close to the article identification device, which can also reduce the power to be used in transmitting and receiving the RF signal.

The present invention can be used for diagnosing the operation of known trap devices, e.g. steam traps and gas traps, disposed in piping. It is known that, for precise diagnosis of the operation of trap devices, data such as parameters for use in diagnosing corresponding to models and specifications of respective trap devices must be inputted into a diagnosing device. According to the present invention, such data can be wirelessly taken from the identification device. In order to make precise diagnosis, parameters necessary for diagnosing a particular object should be set in the operation diagnosing device. According to the present invention, such parameters can be automatically selected based on the information received from the article identification device, which eliminates manual selection and inputting of such parameters.

DETAILED DESCRIPTION OF THE INVENTION

Now, referring to FIGS. 1 through 4, the present invention is described with reference to a system for diagnosing operation of steam traps by way of example.

Figure 2:
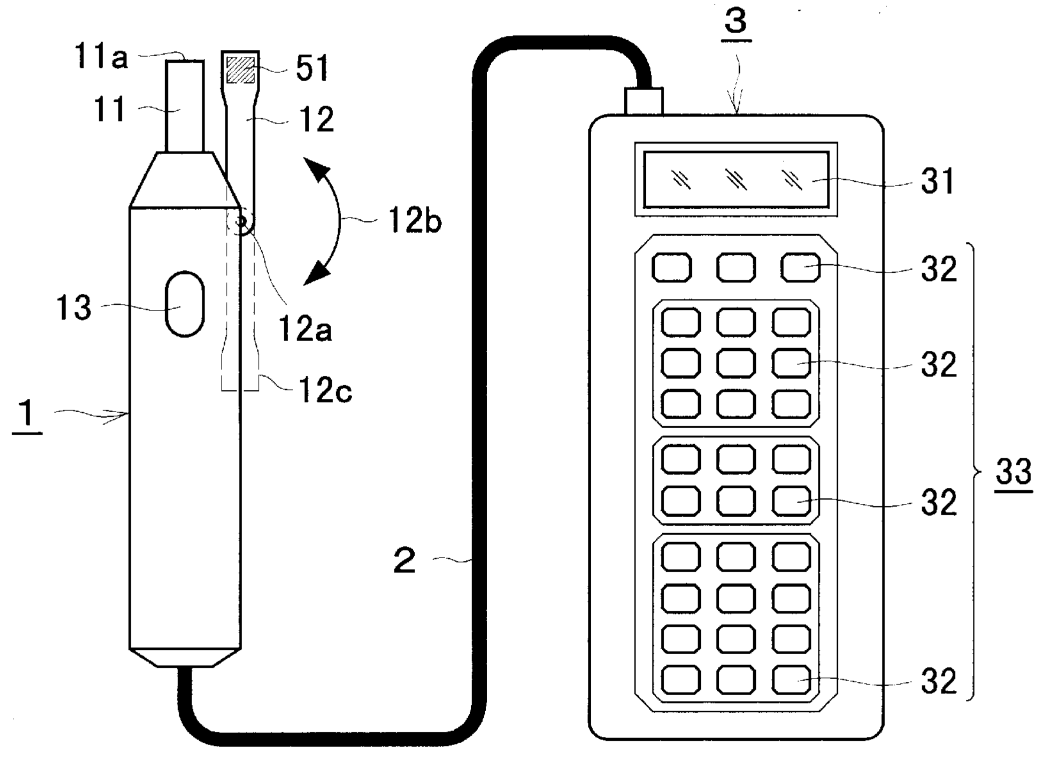
FIG. 2 is a plan view of a diagnosing device shown in FIG. 1.

First, referring to FIG. 2, there is shown a diagnosing device for diagnosing the operation of a steam trap. A steam trap from which steam is leaking generates ultrasonic vibrations of a magnitude corresponding to the steam leakage. The diagnosing device makes an advantage of this fact to determine the presence of steam leakage from a steam trap and the amount of leaking steam, and makes a judgment as to whether the steam trap is operating well.

The diagnosing device includes a generally rod-shaped probe 1, and a handheld body 3 adapted to be connected to the probe by a cable 2.

The probe 1 has a rod-shaped detecting section 11 at its one end. A vibration detector (not shown) for detecting the above-stated ultrasonic vibrations is mounted at its tip end 11*a* of the detecting section 11. The tip end 11*a* of the detector is urged against a portion of the outer surface of a steam trap (not shown), to thereby detect the ultrasonic vibrations of the steam trap which would be caused if steam is leaking from the steam trap. The detector generates a vibration-representative signal representing the detected vibrations. The vibration-representative signal is applied through the cable 2 to the device body 3.

The body 3 has a generally flat box shape and contains a CPU therein. The CPU determines whether or not steam is leaking from the steam trap and, if leaking, how much is the leakage, on the basis of the correlation between the vibration-representative signal from the probe 1 and the amount of steam leakage. The CPU diagnoses the operation of the steam trap to determine, based on the measurement, whether the steam trap is operating normally or not, and displays the diagnosis on a display section 31, such as a liquid crystal display, disposed on the upper portion of the diagnosing device. The CPU also stores the result of the diagnosis in a memory (not shown) in the device body 3.

The correlation between the vibration-representative signal and the amount of steam leakage is stored beforehand in the memory in the device body 3. Such correlation differs, depending on types of traps or operating principle, steam pressures, steam temperatures and so forth. Thus, a plurality of correlation data representing such correlations for respective ones of various types or for management numbers of traps used, are stored in the memory of the operation diagnosing device. Then correlation data appropriate for a particular steam trap of which operation is to be diagnosed can be selected by inputting the trap type and trap management number of the steam trap by pressing appropriate buttons 32 on a panel 33 below the display 31. Thus, appropriate parameters for use in diagnosing the operation of the trap is selected and set. As will be described later, according to the illustrated embodiment, the parameters for use in diagnosis are automatically set in the diagnosing device upon receipt of article identification data sent through the probe 1 separate from the vibration-representative signal.

Figure 1:
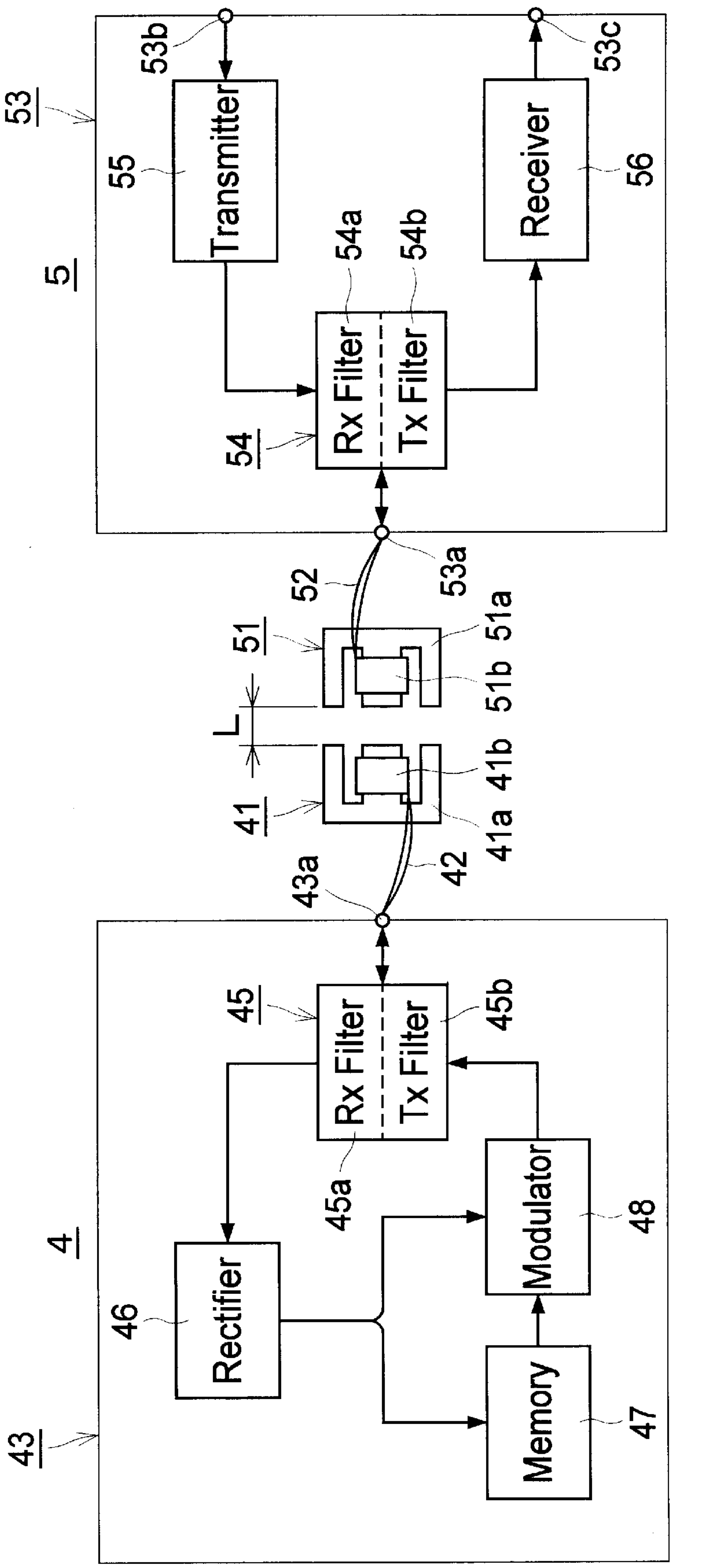
FIG. 1 a block diagram of a major part of a diagnosing system according to embodiment of the present invention.

In addition to its primary function of determining the presence of steam leakage and the amount of leakage, if any, to thereby diagnose the operation of steam traps, the diagnosing device according to the present invention has a function to wirelessly take in article identification data identifying the steam traps stored in an article identification device. FIG. 1 shows an article identification device 4 and a data taking in section 5 of the diagnosing device.

Figure 3:
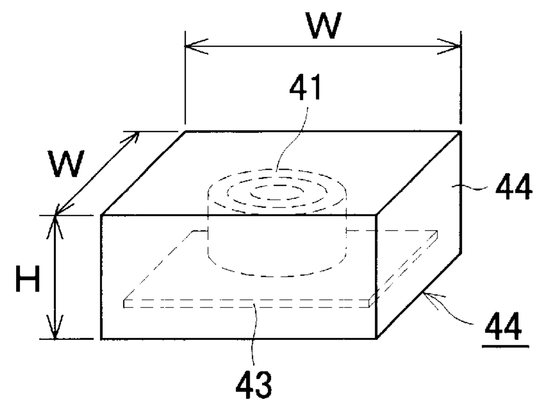
FIG. 3 is a perspective view of an article identification device shown in FIG. 1.
Figure 4A:
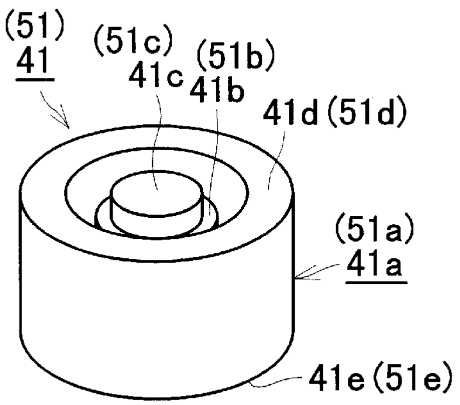
FIG. 4A is a perspective view of an antenna element show in FIG. 1.
Figure 4B:
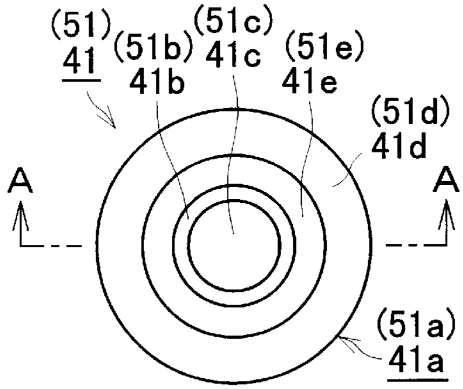
FIG. 4B is a plan view of the antenna element.
Figure 4C:
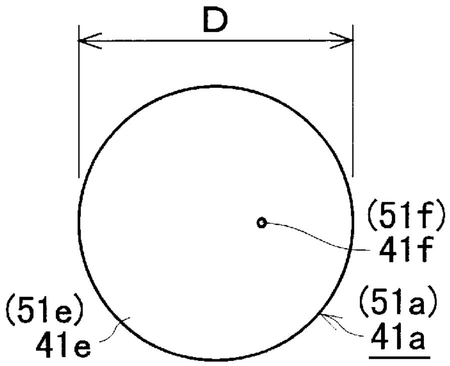
FIG. 4C is a bottom view of the antenna element.
Figure 4D:
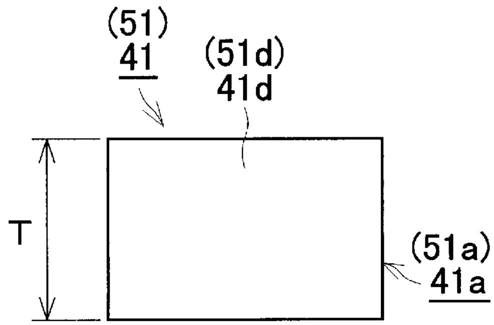
FIG. 4D is a side view of the antenna element.
Figure 4E:
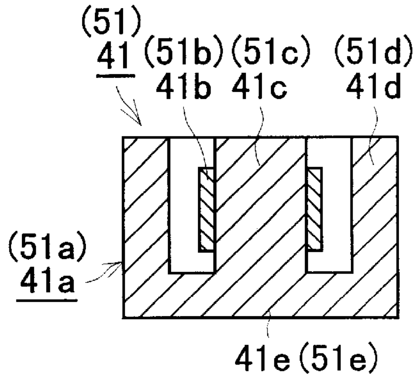
FIG. 4E is a cross-sectional view of the antenna element along the line 4E—4E in FIG. 4B.

The article identification device 4 includes an antenna element 41 for transmitting and receiving radio waves to and from the data taking in section 5, and a circuit board 43 connected to the antenna element 41 through signal lines 42. The antenna element 41 and the circuit board 43 is disposed in, for example, a parallelepiped resin case 44, as shown in FIG. 3. The case 44 with the antenna element 41 and the circuit board 43 therein is mounted on or near the trap directly by means of any appropriate means, such as a string or wire.

The antenna element 41 includes a core 41*a* of a magnetic material, e.g. ferrite, a RF coil 41*b* wound on the core 41*a* and connected to the signal lines 42. More specifically, as shown in FIGS. 4A through 4E, the core 41*a* includes a center column 41*c*, a ring 41*d* surrounding the center column 41*c* with a spacing disposed between them, and a disc-shaped bottom 41*e* coupling the bottom ends of the column 41*c* and the ring 41*d*. The center column 41*c*, the ring 41*d* and the bottom 41*e* may be formed as separate members and jointed together to form the core 41*a*. Alternatively, they may be formed as a single member. The RF coil 41*b* is wound on the column 41*c*. The signal lines 42 are passed through a through-hole 41*f* in the bottom 41*e* and connected to the circuit board. The antenna element 41 has an outer diameter D of, for example, 10 mm and a thickness T of, for example, several millimeters.

As shown in FIG. 1, the circuit board 43 includes a filter section 45, a rectifier section 46, a memory section 47 and a modulator section 48. The signal lines 42 are connected via a terminal 43*a* on the board 43 to the filter section 45. The filter section 45 includes two band-pass filters 45*a* and 45*b*. The band-pass filter (Rx filter) 45*a* is for filtering the received signal, whereas the band-pass filter (Tx filter) 45*b* is for the signal to be transmitted.

The rectifier section 46 includes rectifying and smoothing circuitry including, for example, a combination of a diode-connected rectifying circuit and a smoothing capacitor. The rectifier section 46 rectifies and smoothes an output signal of the reception filter 45*a*.

The memory section 47 includes, for example, a non-volatile, semiconductor memory, such as a ROM, in which stored is article identification (ID) data identifying the trap for which the article identification device 4 is used. The article identification data may include, for example, the model or type of the trap and its management number.

The modulator section 48 includes a RF oscillator circuit (not shown), which generates a RF signal acting as a carrier. The carrier is modulated, e.g. amplitude-modulated, with identification data stored in the memory section 47, and the modulated signal is applied to the filter 45*b* in the filter section 45.

The memory section 47 and the modulator section 48 are driven from the output of the rectifier section 46.

The components of the circuit board 43 can be realized by relatively small-scale and simple-structured electrical circuits. Accordingly, the article identification device 4 formed of the circuit board 43 and the antenna element 41 can be sufficiently small. For example, an article identification device 4 having a width W of amount 20 mm and a height H of about 15 mm, as shown in FIG. 3, can be realized by disposing the circuit board 43 in such a manner that its upper major surface lies in a horizontal plane. The antenna element 41 is disposed on the upper surface of the circuit board 43, with its bottom 41*e* facing the upper surface of the circuit board 43. It should be noted that the shape and structure of the identification device 4 are not limited to the ones shown in FIG. 3. For example, the shape may be globular or of any other suitable shape, and the antenna element 41 and the circuit board 43 may be disposed, being separated from each other. Also, the structure of the antenna element 41 shown in FIGS. 4A through 4E is only an example, but any other suitable structure can be employed only if the antenna element 41 can transmit and receive predetermined radio waves to and from an antenna element 51 described later.

The data taking in section 5 (FIG. 1) of the operation diagnosing device includes the aforementioned antenna element 51 of the completely same structure as the antenna element 41 of the article identification device 4, and a circuit board 53 connected to the antenna element 51 by signal lines 52. Since the antenna element 51 has completely the same structure as the antenna element 41 shown in FIGS. 4A through 4E, the details are not described, but the components of the antenna element 41 corresponding to those of the antenna elements 51 are attached with the reference numerals in parentheses with the "4" of ten digits replaced by "5".

Figure 5:
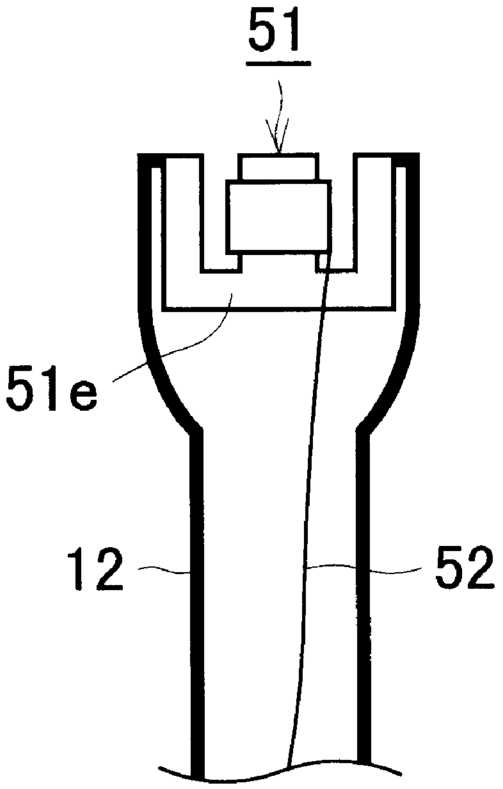
FIG. 5 shows an internal structure of a tip end portion of a probe of the diagnosing device of FIG. 1.

As shown in FIG. 5, the antenna element 51 is embedded in the tip end of a rod member 12 with the end opposite to the bottom 51*e* exposed. The proximal end of the antenna rod member 12 is coupled to the side surface of the probe 1 at a location near the tip end of the probe 1 by a pivot 12*a*, about which the antenna rod member 12 can rotate by about 180 degrees as indicated by an arrow 12*b*. For taking data from the article identification device 4 into the operation diagnosing device, the antenna rod member 12 is turned by about 180 degrees so that the tip end of the antenna element 51 can face the identification device 4. After object identification data is taken into the diagnosing device, the rod member 12 is turned back into the original position on the side of the probe 1 as indicated by a broken line 12*c*.

The circuit board 53 is built in the probe 1 and includes a filter section 54, a transmitter section (Tx) 55 and a receiver section (Rx) 56, as shown in FIG. 1. The signal lines 52 extend from the antenna element 51 through the rod member 12 and are connected to the filter section 54.

The filter section 54 includes a band-pass filter (Tx filter) 54*a* for a signal to be transmitted, having the same pass band as the received signal band-pass filter 45*a* of the article identification device 4. The filter section 54 also includes a band-pass filter (Rx filter) 54*b* for a received signal, having the same pass band as the transmission signal band-pass filter (Tx filter) 45*b* of the article identification device 4.

The transmitter section 55 includes a RF oscillator circuit (not shown), and applies a RF oscillation signal generated by the oscillator circuit to the filter 54*a* when a transmission command is applied to it through an input terminal 53*b* on the circuit board 53. The transmission command is generated and applied to the transmitter section 55 when a switch 13 (FIG. 2) on the side of the probe 1 is pressed. This causes a radio wave corresponding to the RF oscillation signal to be radiated from the antenna element 51. The radio wave corresponds to the first RF signal referred to in the accompanying claims.

The radio wave radiated from the antenna element 51 is received by the antenna element 4 of the article identification device 4, and the received signal is applied through the rectifier section 46 through the received signal band-pass filter 45*a*. The rectifier section 46 rectifies and smoothes the signal applied thereto from the filter 45*a* to derive DC power therefrom, which power is applied to the memory section 47 and the modulator section 48 to drive them. The modulator section 48 reads out the identification data stored in the memory section 47 and amplitude-modulates the carrier which the oscillator in the modulator section 48 generates, with the identification data. The amplitude-modulated signal is applied through the transmission signal band-pass filter 45*b* to the antenna element 41, and a radio wave containing the identification data is radiated. The radio wave radiated from the antenna element 41 corresponds to the second RF signal referred to in the accompanying claims. Also, the DC power outputted from the rectifier section 46 corresponds to the command to respond referred to in the accompanying claims.

The radio wave radiated from the antenna element 41 is received by the antenna element 51 on the operation diagnosing device, and the received signal is applied through the received signal band-pass filter 54*b* to the receiver section 56, where the signal is demodulated to provide the identification data contained in the received signal. The derived identification data is developed at an output terminal 53*c* on the circuit board 53, from which it is applied through the cable 2 to the CPU in the device body 3. As described previously, the CPU selects the correlation data for the trap of which operation is to be diagnosed, based on the identification data inputted thereto via the cable 2. Also, the trap type and the trap management number derived from the identification data are displayed on the display 31. The sequential operation of the CPU is achieved under the control of a control program stored in the memory provided in the device body 3.

Seeing the displayed trap type and management number, the operator knows that the necessary setting has been completed in the diagnosing device, and returns the rod member 12 to the position indicated by the broken line 12*c* in FIG. 2.

The frequencies used in wireless communications between the antenna elements 41 and 51 are within a range of from 1 MHz to 10 MHz, which are MF and HF bands. The pass bands of the band-pass filters 45*a*, 45*b*, 54*a* and 54*b* are determined, depending on the wireless communication frequencies used.

As described above, according to the present invention, the article identification data stored in the article identification device 4 is wirelessly fed to the operation diagnosing device without need for bringing the diagnosing device or its probe 1 into contact with the identification device 4. Accordingly, if the tip end of the data taking in section 5 of the probe 1 cannot be placed near the identification device 4 or cannot be faced the front of the identification device 4, the information stored in the identification device 4 can be taken into the diagnosing device without fail. In other words, different from the previously described conventional technique in which bar codes are used, there is no strict restriction on the location on objects to be diagnosed where the identification devices 4 are mounted.

Also, if the surface of the identification device 4 is more or less scarred or stained, the wireless communications may not be affected. This is very advantageous particularly when the article identification devices 4 and, hence, steam traps are disposed in plants or outdoors which are relatively dirty and dusty.

The antenna element 51 may be disposed near the antenna element 41 of the identification device 4 with a spacing L (FIG. 1) therebetween of, for example, 10 mm or less to thereby inductively couple the antenna elements 41 and 51 so that object identification data can be inductively transmitted to the diagnosing device. This arrangement is particularly advantageous when it is desired to achieve the data transmission with small power.

Although, in the above-described embodiment, the data taking in section 5 is built in the probe 1, a separate device having the same function as the section 5 may be used independently of the diagnosing device.

Also, in the above-described embodiment, the RF signal is radiated from the diagnosing device to the article identification device 4 only when the switch 13 on the side of the probe 1 is pressed, but it may be arranged that the RF signal can be radiated continuously. However, power consumption on the diagnosing device side can be reduced when the RF signal is radiated only when the switch 13 is pressed.

Further, instead of deriving driving power from the radio wave received at the identification device 4, a battery or any other suitable power supply means may be associated with the identification device 4. In such a case, it is arranged that the modulator section 48 can be driven to operate when the radio wave from the diagnosing device is received by the antenna element 41.

The modulator section 48 has been described to use AM modulation, but other modulation system, e.g. frequency modulation (FM) or pulse code modulation (PCM), may be used. Alternatively, a digital modulation system, e.g. an ASK (Amplitude Shift Keying), PSK (Phase Shift Keying) or FSK (Frequency Shift Keying) system, may be used.

Instead of trap types and trap management numbers, other data, e.g. detailed specifications of traps and locations where traps are disposed, may be used, only if such data can identify individual traps.

Also, instead of wiring the probe 1 and device body 3 with the cable 2 for transmission of various signals including the vibration-representative signal, infrared communications according to the IrDA or conventional wireless communications may be employed. Alternatively, both wireless and wired communications can be used.

What is claimed is:

1. An operation diagnosing device with a function to diagnose the operation of an object, comprising:

a first transmitter section outputting a first transmission signal;

a first transmitting element receiving the first transmission signal, converting the received first transmission signal into a first RF signal and radiating the first RF signal into a space;

a first receiving element receiving a second RF signal from the space and converting the received second RF signal into a first reception signal; and a first receiver section receiving the first reception signal and deriving from the first reception signal, operation diagnosing parameter determining information determining operation diagnosing parameters for use in diagnosing the operation of the object of which operation is to be diagnosed;

said operating diagnosing parameters being set in accordance with said derived operation diagnosing parameter determining information, said diagnosing de vice being adapted to transmit said first RF signal to and receive said second RF signal from an article identification device mounted on or near to said object, said article identification device including a memory section in which said operation diagnosing parameter determining information of said object has been stored, said article identification device, upon receipt of said first RF signal from said space, converting a signal containing said operation diagnosing parameter determining information stored in said memory section into said second RF signal and radiating said second RF signal into the space.

2. The operation diagnosing device according to claim 1 wherein said first transmission section outputs said first transmission signal upon receipt of an external transmission command.

3. The operation diagnosing device according to claim 1 wherein at least one of said first transmission section, said first transmitting element, said first receiving element and said first receiver section is built in a casing together with means for diagnosing the operation of the object.

4. The operation diagnosing device according to claim 1 wherein said first transmitting element is arranged to function also as said first receiving element.

5. The operation diagnosing device according to claim 1 further comprising a setting section for automatically setting all or part of said predetermined information derived by said first receiver section.

6. The operation diagnosing device according to claim 1 wherein said first transmission signal is an AC signal having a constant frequency and a constant amplitude.

7. The operation diagnosing device according to claim 1 wherein said object is a trap device disposed in piping.

8. An article identification device adapt ed to be mounted on or near an object of which the operation is to be diagnosed by an operation diagnosing device, comprising:

a second receiving element receiving a first RF signal from a space, converting the received first RF signal into a second reception signal, and outputting the second reception signal;

a second receiver section receiving the second reception signal outputted from the second receiving element and generating and outputting a command to respond;

a second transmitter section comprising a memory section in which operation diagnosing parameter determining information determining parameters for use in diagnosing the operation of the object has been stored, and outputting a second transmission signal containing said operation diagnosing parameter determining information stored in said memory when the command to respond is outputted from the second receiver section ; and a second transmitting element receiving the second transmission signal, converting the received second transmission signal into a second RF signal, and radiating the second RF signal into the space;

said article identification device being adapted to receive said first RF signal from and transmit said second RF signal to said operation diagnosing device, said operation diagnosing device having a function to radiate said first RF signal into the space, to receive said second RF signal and to derive said operation diagnosing parameter determining information from the received second RF signal.

9. The article identification device according to claim 8 wherein said second transmitting element is arranged to function also as said second receiving element.

10. The article identification device according to claim 8 wherein said second receiver section comprises an electrical circuit including only passive elements, said second receiver section deriving power from said second reception signal and outputting the derived power as said command to respond; and said second transmitter section is arranged to be driven from said power outputted from said second receiver section.

11. The article identification device according to claim 8 wherein at least two of said second receiving element, said second receiver section, said second transmitter section and said second transmitting element are formed in a single unit.

12. The article identification device according to claim 8 wherein said object is a trap device disposed in piping.

13. An operation diagnosing system comprising:

an operation diagnosing device with a function to diagnose the operation of an object, comprising:

a first transmitter section outputting a first transmission signal;

a first transmitting element receiving the first transmission signal, converting the received first transmission signal into a first RF signal and radiating the first RF signal into a space;

a first receiving element receiving a second RF signal from the space and converting the received second RF signal into a first reception signal; and a first receiver section receiving the first reception signal and deriving from the first reception signal, operation diagnosing parameter determining information determining operation diagnosing parameters for use in diagnosing the operation of the object of which operation is to be diagnosed;

said operation diagnosing parameters being set in accordance with said derived operation diagnosing parameter determining information; and an article identification device adapted to be mounted on or near said object, comprising:

a second receiving element receiving the first RF signal from the space, converting the received first RF signal into a second reception signal, and outputting the second reception signal;

a second receiver section receiving the second reception signal outputted from the second receiving element and generating and outputting a command to respond;

a second transmitter section comprising a memory section in which said operation diagnosing parameter determining information has been stored, and outputting a second transmission signal containing said operation diagnosing parameter determining information stored in said memory when the command to respond is outputted from the second receiver section; and a second transmitting element receiving the second transmission signal, converting the received second transmission signal into a second RF signal, and radiating the second RF signal into the space.

14. The operation diagnosing system according to claim 13 wherein said first transmitting element and said second receiving element are made to be close to each other so as to be inductively coupled with each other, whereby said first RF signal is inductively sent to said second receiving element.

15. The operation diagnosing system according to claim 13 wherein said second transmitting element and said first receiving element are made to be close to each other so as to be inductively coupled with each other, whereby said second RF signal is inductively sent to said second receiving element.

16. The operation diagnosing system according to claim 13 wherein said object is a trap device disposed in piping.

* * * * *